United States Patent
Jung et al.

(10) Patent No.: US 9,094,881 B2
(45) Date of Patent: Jul. 28, 2015

(54) METHOD FOR MEASUREMENT IN WIRELESS COMMUNICATION SYSTEM AND APPARATUS FOR THE SAME

(71) Applicant: LG ELECTRONICS INC., Seoul (KR)

(72) Inventors: Sung Hoon Jung, Anyang-si (KR); Sung Jun Park, Anyang-si (KR); Jae Wook Lee, Anyang-si (KR); Young Dae Lee, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/346,927

(22) PCT Filed: Oct. 2, 2012

(86) PCT No.: PCT/KR2012/007983
§ 371 (c)(1),
(2) Date: Mar. 24, 2014

(87) PCT Pub. No.: WO2013/051834
PCT Pub. Date: Apr. 11, 2013

(65) Prior Publication Data
US 2014/0220982 A1 Aug. 7, 2014

Related U.S. Application Data

(60) Provisional application No. 61/542,279, filed on Oct. 2, 2011.

(51) Int. Cl.
*H04W 36/00* (2009.01)
*H04W 8/26* (2009.01)
(Continued)

(52) U.S. Cl.
CPC ............ *H04W 36/0088* (2013.01); *H04W 8/26* (2013.01); *H04W 24/08* (2013.01); *H04W 36/0083* (2013.01); *H04W 36/36* (2013.01); *H04W 48/02* (2013.01)

(58) Field of Classification Search
CPC . H04W 36/30; H04W 36/36; H04W 36/0088; H04W 36/0083; H04W 8/26; H04W 24/10; H04W 24/08
USPC ........... 455/437, 414.1, 418, 419, 423, 456.1, 455/67.11, 424; 370/252, 331, 328
See application file for complete search history.

(56) References Cited

U.S. PATENT DOCUMENTS

2011/0201324 A1* 8/2011 Persson et al. ............. 455/422.1
2011/0306345 A1* 12/2011 Wu ............................. 455/436
(Continued)

OTHER PUBLICATIONS
3GPP TS 36.304 V10.2.0, (Jun. 2011), 3rd Generation Partnership Project; Technical Specification Group Radio Access Network; Evolved Universal Terrestrial Radio Access (E-UTRA); User Equipment (UE) procedures inidle mode; (Release10). pp. 1-33.
(Continued)

*Primary Examiner* — Khai M Nguyen
(74) *Attorney, Agent, or Firm* — Birch, Stewart, Kolasch & Birch, LLP

(57) ABSTRACT

A method for measurement by a user equipment (UE) in a wireless communication system is provided. The method includes: receiving cell identity split information indicating a cell identity set reserved for a predetermined cell type from a network; determining whether to apply the cell identity split information in performing measurement; and measuring at least one cell. If the UE receives a logged measurement configuration including information regarding performing of logged minimization driving test (MDT), the measurement is performed without applying the cell identity split information. The UE does not receive the logged measurement configuration, the measurement is performed by applying the cell identity split information.

16 Claims, 16 Drawing Sheets

(51) Int. Cl.
 *H04W 24/08* (2009.01)
 *H04W 36/36* (2009.01)
 *H04W 48/02* (2009.01)

(56) References Cited

U.S. PATENT DOCUMENTS

2012/0113837 A1* 5/2012 Siomina et al. ............... 370/252
2013/0077515 A1* 3/2013 Jung et al. .................... 370/252

OTHER PUBLICATIONS

3GPP TS 37.320 V10.2.0, (Jun. 2011), 3rd Generation Partnership Project.; Technical Specification Group Radio Access Network; UTRA, E-UTRA; Radio measurement collection for Minimization of Drive Tests (MDT); Overall description; Stage 2, (Release 10). pp. 1-17.

3GPP TSG-RAN WG2#68bis, R2-100453, 4.3.1, Motorola, "Drive Testing and HeNBs", Discussion and Decision, Jan. 18-22, 2010, Valencia, Spain, pp. 1-2.

* cited by examiner

Logged measurement

METHOD FOR MEASUREMENT IN WIRELESS COMMUNICATION SYSTEM AND APPARATUS FOR THE SAME

CROSS REFERENCE TO RELATED APPLICATIONS

This application is the National Phase of PCT/KR2012/007983 filed on Oct. 2, 2012, which claims priority under 35 U.S.C. 119(e) to U.S. Provisional Application No. 61/542,279 filed on Oct. 2, 2011, all of which are hereby expressly incorporated by reference into the present application.

TECHNICAL FIELD

The present invention relates to a wireless communication, more particularly, to a measurement method and an apparatus supporting the same in a wireless communication system.

BACKGROUND ART $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A micro cell, a femto cell, and a pico cell, etc., having a small service area can be installed in a specific location of a macro cell having a wide coverage.

Due to mobility of a user equipment (UE) represented as a mobile device, quality of a currently provided service may deteriorate or a cell capable of providing a better service may be detected. Accordingly, the UE may move to a new cell, which is called performing of the mobility of the UE.

In order to perform the mobility, the UE persistently performs measurement on a serving cell and a neighboring cell. When the measurement result satisfies a condition for performing the mobility, the UE can receive an instruction from the serving cell and can directly perform the mobility.

There may be a particular type of cell providing a service only to an access-permitted member UE. Such a cell may be, for example, a closed subscriber group (CSG) cell. When a UE performs mobility, the UE determines whether or not the UE itself is a member when a target cell is a CSG cell. Only when the UE itself is a member of the target cell, the UE may access the corresponding cell.

In the foregoing wireless communication system, in order to support mobility of a UE, predetermined type cell identification information may be reserved in order to first discriminate a particular type of cell such as the CSG cell. A network may provide the reserved cell identification information to the UE to allow the UE to perform mobility more effectively.

Meanwhile, when the UE receives the reserved cell identification information, it may omit measurement of the particular type of cell based on the cell identification information. Thus, the network cannot obtain a measurement result with respect to the particular type of cell, resulting in a restriction of an operation of the network for network optimization. Thus a more effective measurement method for network optimization is required.

SUMMARY OF INVENTION

Technical Problem

An object of the present invention is to provide a measurement method by a user equipment and an apparatus supporting the same in a wireless communication system.

Solution to Problem

In an aspect, a method for measurement by a user equipment (UE) in a wireless communication system is provided. The method includes: receiving cell identity split information indicating a cell identity set reserved for a predetermined cell type from a network; determining whether to apply the cell identity split information in performing measurement; and measuring at least one cell. If the UE receives a logged measurement configuration including information regarding performing of logged minimization driving test (MDT), the measurement is performed without applying the cell identity split information. The UE does not receive the logged measurement configuration, the measurement is performed by applying the cell identity split information.

The step of performing of the measurement based on the cell identity split information may include: comparing an identity of the at least one cell with the cell identity set indicated by the cell identity split information; and measuring at least one cell having the cell identity not included in the cell identity set among the at least one cell.

The step of performing of the measurement without applying the cell identity split information may include: measuring at least one cell having a cell identity not included in the cell identity set among the at least one cell; and measuring at least one cell having a cell identity included in the cell identity set among the at least one cell.

The method may further include performing cell reselection based on the cell identity split information.

The step of performing of the cell reselection may include: excluding the at least one cell having the cell identity included in the cell identity set; selecting a target cell from among the at least one remaining cell; and performing cell reselection with the target cell.

The method may further include reporting a measurement result. When the measurement is performed based on the cell identity split information, the measurement result may include at least one measurement value with respect to the at least one cell having a cell identity not included in the cell identity set.

When the measurement is performed without applying the cell identity split information, the measurement result may include at least one measurement value with respect to the at least one cell having a cell identity included in the cell identity set and the at least measurement value with respect to the at least one cell having a cell identity not included in the cell identity set.

The predetermined cell type may be a closed subscriber group (CSG) cell.

In another aspect, an apparatus operating in a wireless communication system is provided. The apparatus includes: a Radio Frequency (RF) unit transmits and receives radio signals; and a processor operably coupled to the RF unit. The processor is configured to: receive cell identity split information indicating a cell identity set reserved for a predetermined cell type from a network; determine whether to apply the cell identity split information in performing measurement; and measure at least one cell. If the apparatus receives a logged measurement configuration including information regarding performing of logged minimization driving test (MDT), the measurement is performed without applying the cell identity split information. When the apparatus does not receive the logged measurement configuration, the measurement is performed by applying the cell identity split information.

Advantageous Effects of Invention

According to embodiments of the present invention, although a particular type of cell such as a CSG cell is excluded from cell re-selection targets, a UE may measure the corresponding type of cell and logs to report the measurement result to a network. In a communication environment in which the particular type of cell is operated, the network may obtain the measurement result with respect to the particular type of cell through a logged MDT operation performed by the UE that does not support the particular type of cell. Based on the obtained measurement result, the network can optimize an operation thereof and provide a more enhanced service.

MODE FOR THE INVENTION

Figure 1:
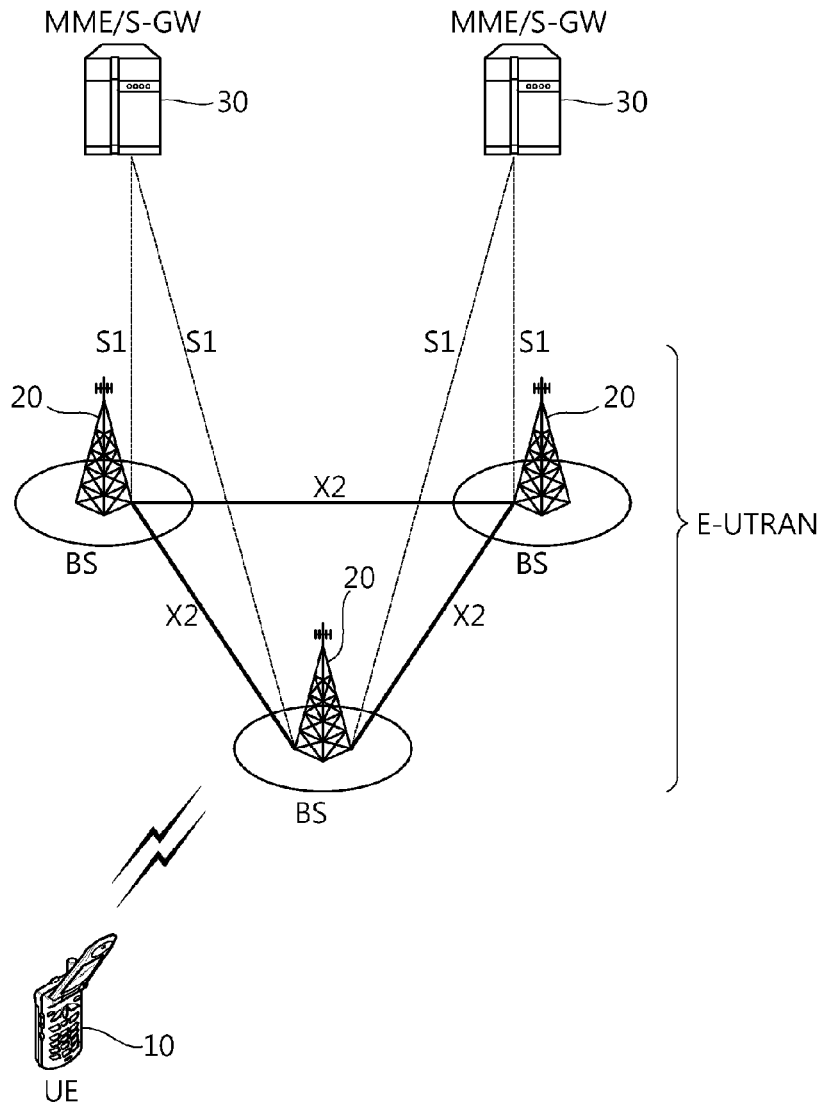
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
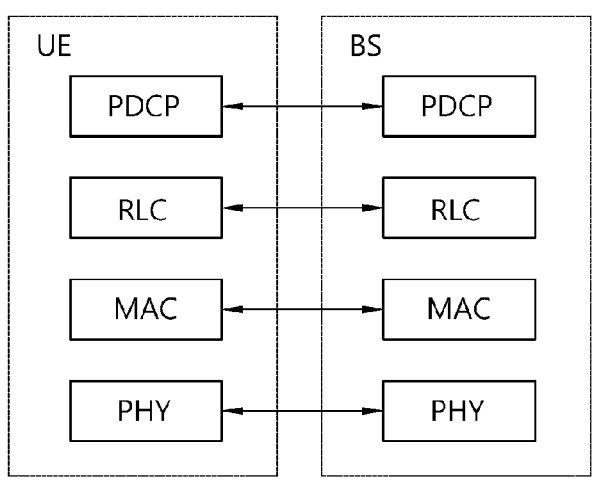
FIG. 2 is a diagram illustrating a radio protocol architecture for a user plane.
Figure 3:
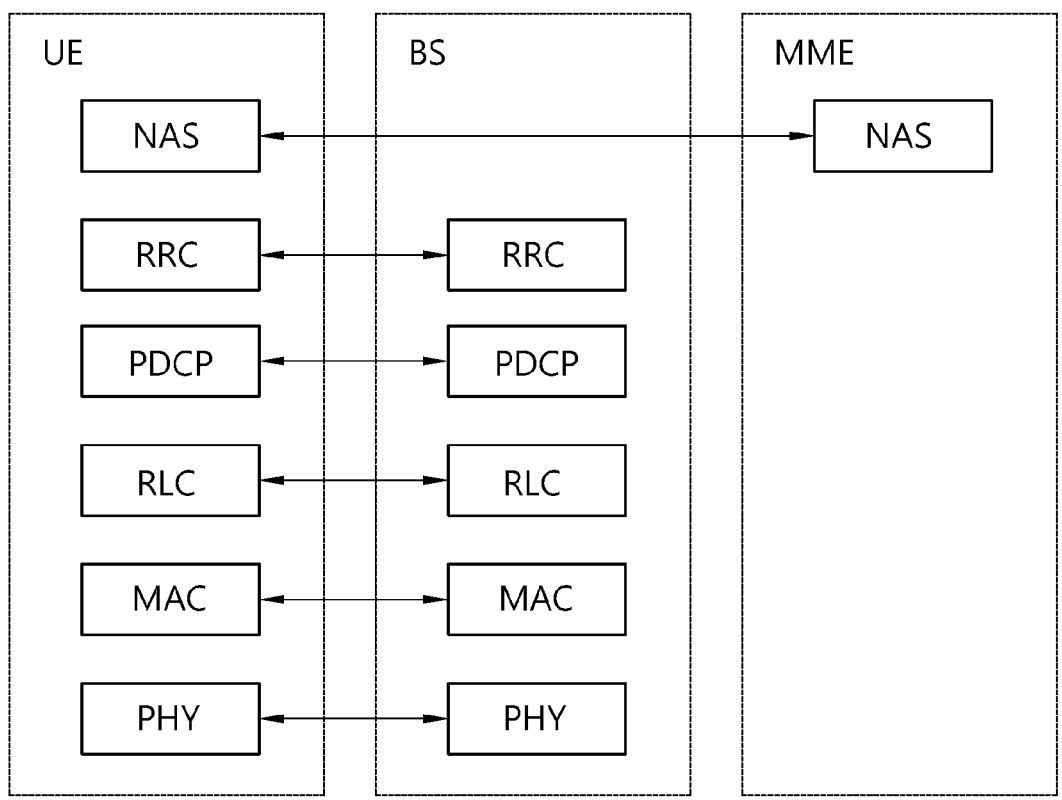
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several subcarriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
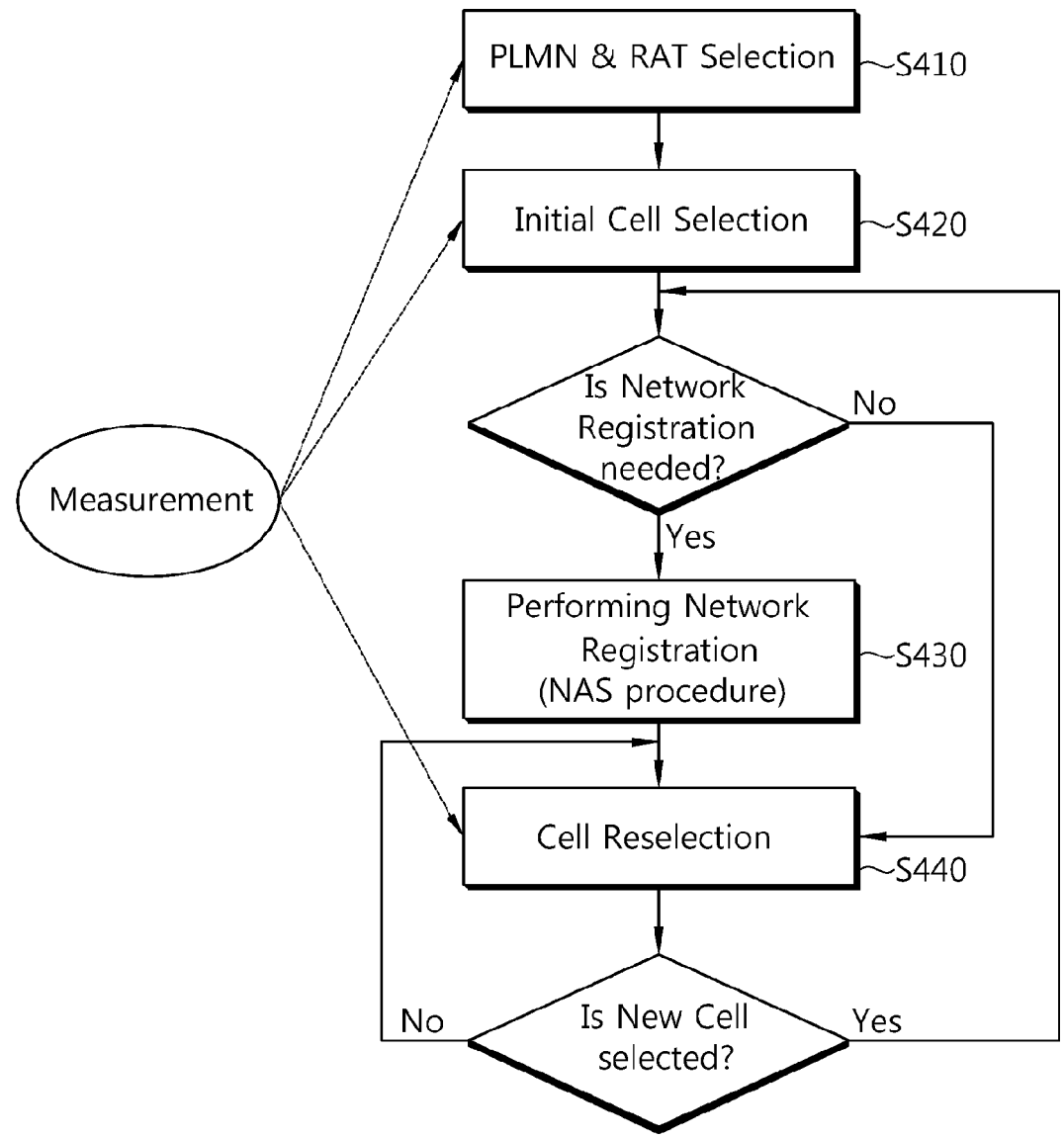
FIG. 4 is a flow chart illustrating an operation of a UE in an RRC idle state.

FIG. 4 is a flow chart illustrating an operation of a UE in an RRC idle state. Specifically, FIG. 4 shows a procedure in which a UE is registered to a network through a cell selection process when power of the UE is turned on, and a cell reselection is performed when necessary.

Referring to FIG. 4, the UE selects a radio access technology (RAT) for communicating with a PLMN (public land mobile network) as a network the UE wants to receive a service therefrom (S410). Information regarding the and RAT may be selected by a user of the UE, or that stored in a USIM (universal subscriber identity module) may be used.

The UE selects a cell having the greatest value among cells in which signal strength or quality thereof is greater than a particular value (S420). This is performed by a UE as power thereof is turned on, which may be called an initial cell selection. The cell selection procedure will be described later. After the cell selection, the UE receives system information periodically transmitted by a BS. The particular value refers to a value defined in the system in order to guarantee quality of a physical signal in data transmission and reception. Thus, it may vary according to an applied RAT.

When a network registration is required, the UE performs a network registration procedure (S430). In order to receive a service (e.g., paging) from the network, the UE registers its information (e.g., an IMSI). The UE is not registered to a network whenever a cell is selected, and registered to a network when information (e.g., tracking area identity (TAI) of a network received from the system information and information of a network the UE knows are different.

The UE performs cell re-selection based on a service environment provided in a cell, a terminal environment, or the like (S440). When signal strength or quality value measured from a BS serving the UE is lower than a value measured from a BS of an adjacent cell, the UE selects one of cells providing better signal characteristics than that of the cell of the BS the UE has accessed. This process is called a cell re-selection, discriminated from initial cell selection performed twice. Here, in order to prevent a cell is frequently re-selected according to a change in signal characteristics, a temporal constraint is provided. The cell re-selection procedure will be described later.

Figure 5:
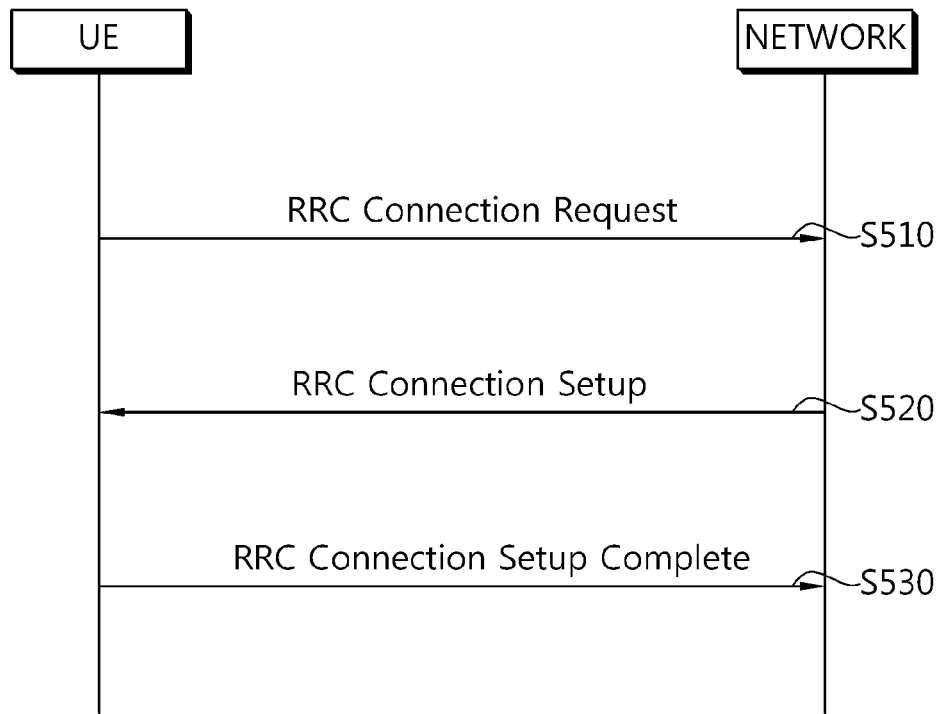
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 6:
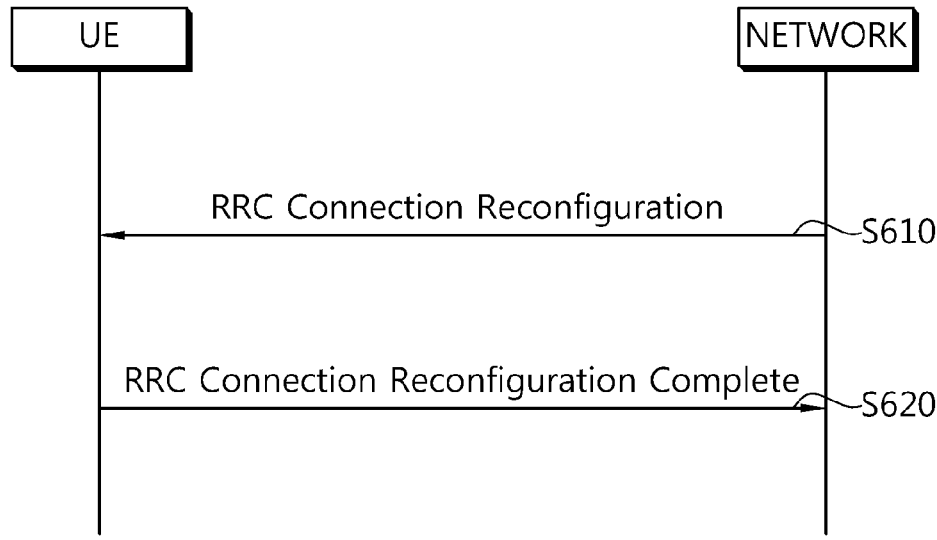
FIG. 6 is a flowchart showing an RRC connection reconfiguration procedure.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_S = Q_{meas,s} + Q_{hyst}, R_n = Q_{meas,n} - Q_{offset}$$ [Math.1]

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

In the specification of 3GPP LTE, normal communication cannot be performed in the following conditions.

When a UE determines that there is a serious problem with a downlink communication link quality based on radio quality measurement result of a physical layer of the UE.

When it is determined that there is a problem with an uplink transmission as a random access procedure fails continuously in a MAC sub-layer.

When it is determined that there is a problem with an uplink transmission as an uplink data transmission continuously fails in an RLC sublayer.

When it is determined that handover has failed.

When a message received by the UE does not pass integrity check.

Hereinafter, an RRC connection re-establishment procedure will be described in detail.

Figure 7:
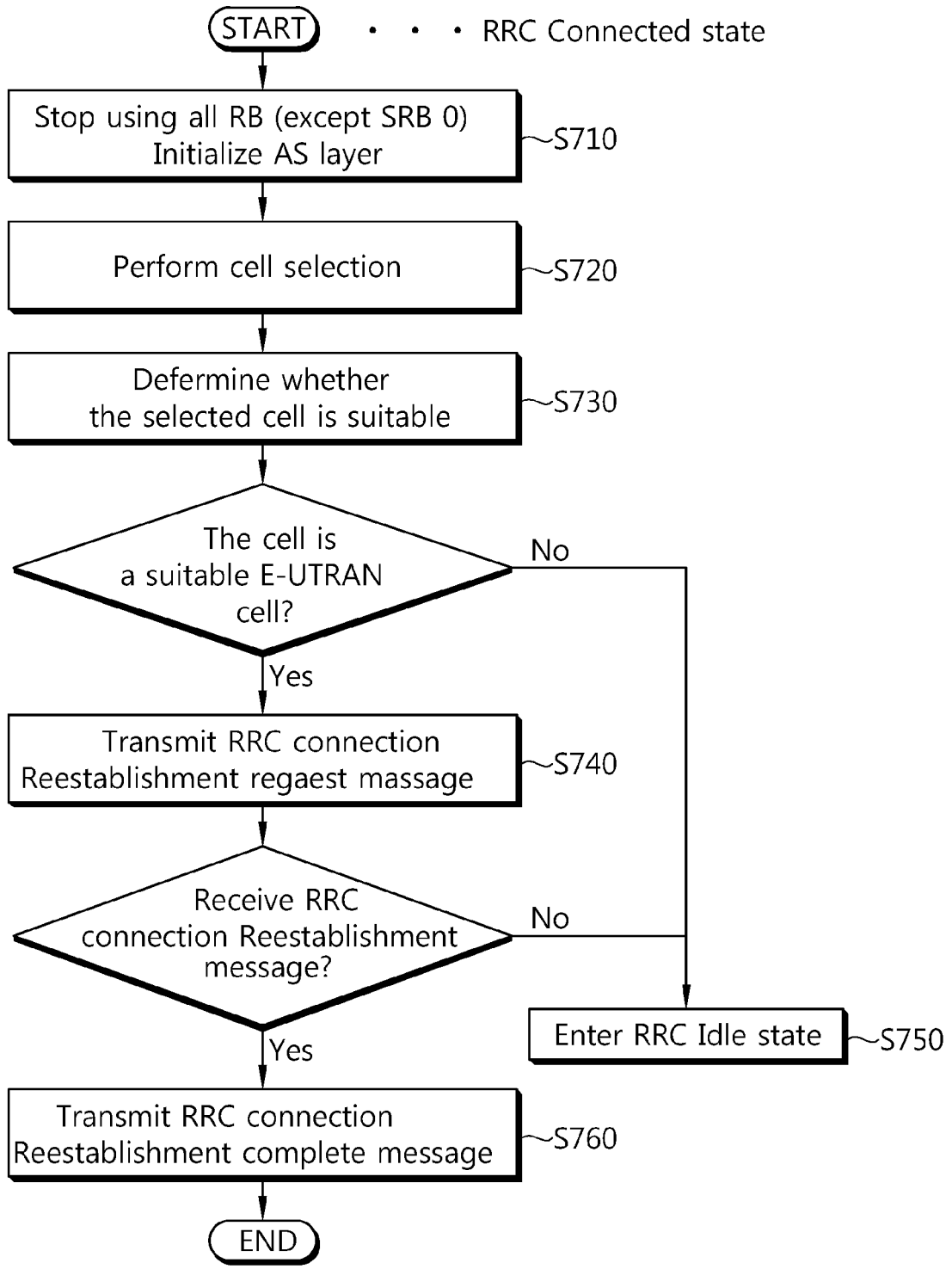
FIG. 7 is a flow chart illustrating an RRC connection re-establishment procedure.

FIG. 7 is a flow chart illustrating an RRC connection re-establishment procedure.

Referring to FIG. 7, a UE stops using of all the set radio bearers excluding SRB0 (Signaling Radio Bearer #0), and initializes various sub-layers of an Access Stratum (AS) (S710). Also, the UE sets each sub-layer and physical layer as a default configuration. During this process, the UE is maintained in an RRC connected state.

The UE performs a cell selection procedure to perform an RRC connection reestablishment procedure (S720). Although the UE is maintained in the RRC connected state, the cell selection procedure included in the RRC connection re-establishment procedure may be performed in the same manner as the cell selection procedure performed by the UE in an RRC idle state.

After performing the cell selection procedure, the UE checks system information of a corresponding cell to determine whether or not the corresponding cell is an appropriate cell (S730). When the selected cell is determined to be an appropriate E-UTRAN cell, the UE transmits an RRC connection reestablishment request message to the corresponding cell (S740).

Meanwhile, when it is determined that the cell selected through the cell selection procedure to perform an RRC connection re-establishment procedure is a cell that uses a different RAT other than the E-UTRAN, the RRC connection re-establishment procedure is stopped and the UE enters an RRC idle state (S750).

The UE may be implemented to finish checking appropriateness of a cell within a limited time through the cell selection procedure and reception of system information of a selected cell. To this end, the UE may drive a timer when an RRC connection reestablishment procedure starts. The timer may be stopped when the UE determines that an appropriate cell has been selected. When the timer expires, the UE may determine that the RRC connection reestablishment procedure has failed and enters an RRC idle state. The timer will be referred to as a radio link failure timer hereinafter. In the LTE specification TS 36.331, a timer named T311 may be utilized as a radio link failure timer. The UE may obtain a set value of the timer from system information of a serving cell.

When the cell receives an RRC connection re-establishment request message from the UE and accepts the request, the cell transmits an RRC connection reestablishment message to the UE.

Upon receiving the RRC connection reestablishment message from the cell, the UE reconfigures a PDCP sublayer and an RLC sublayer with respect to an SRB1. Also, the UE re-calculates various key values in relation to security setting, and re-configures a PDCP sublayer responsible for security with newly calculated security key values. Through this, the SRB1 between the UE and the CELL is open, and an RRC control message may be exchanged. The UE completes resuming of the SRB1, and transmits an RRC connection reestablishment complete message indicating that the RRC connection reestablishment procedure was completed to the cell (S760).

Meanwhile, upon receiving the RRC connection reestablishment request message, if the cell does not accept the request, the cell transmits an RRC connection reestablishment reject message to the UE.

When the RRC connection reestablishment procedure is successfully performed, the cell and the terminal performs an RRC connection reestablishment procedure. Through this, the UE may recover the state before the RRC connection reestablishment procedure was performed and continuity of a service is guaranteed to its maximum level.

The following description is related to a Radio Link Failure (RLF) report.

In order to support mobility robustness optimization (MRO) of a network, when a radio link failure or a handover failure occurs, the UE reports such a failure event to the network.

UE may provide the RLF report to the eNB after successful RRC connection reestablishment. The radio measurements contained in the RLF report may be used to identify coverage issues as the potential cause of the failure. This information may be used to exclude those events from the MRO evaluation of intra-LTE moblility connection failures and redirect them as input to other algorithms.

In case the RRC connection reestablishment fails or the UE does not perform any RRC connection reestablishment, the UE may make the RLF report available to the eNB after reconnecting from idle mode. For this purpose, the UE stores the latest RLF or handover failure related information, and indicates RLF report availability at each subsequent LTE RRC connection (re)establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

Availability of the RLF report at the RRC connection setup procedure is the indication that the UE suffered from a connection failure and that the RLF report from this failure was not yet delivered to the network. The RLF report from the UE includes the following information:

The E-CGI of the last cell that served the UE (in case of RLF) or the target of the handover (in case of handover failure). If the E-CGI is not known, the PCI and frequency information are used instead.

E-CGI of the cell that the reestablishment attempt was made at.

E-CGI of the cell that served the UE at the last handover initialization, i.e. when message 7 (RRC connection reconfiguration) was received by the UE.

Time elapsed since the last handover initialization until connection failure.

An indication whether the connection failure was due to RLF or handover failure.

The radio measurements.

Location of failure.

The eNB receiving the RLF report from the UE may forward the report to the eNB that served the UE before the reported connection failure.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 8:
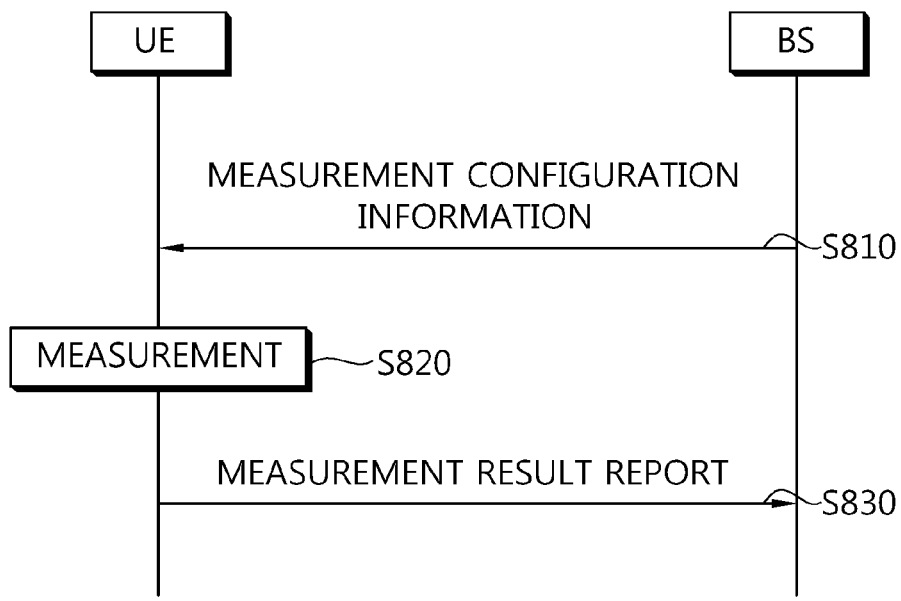
FIG. 8 is a flowchart showing a conventional method of performing measurement.

FIG. 8 is a flowchart showing a conventional method of performing measurement.

A UE receives measurement configuration information from a BS (step S810). A message including the measurement configuration information is referred to as a measurement configuration message. The UE performs measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identity: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Events | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 9:
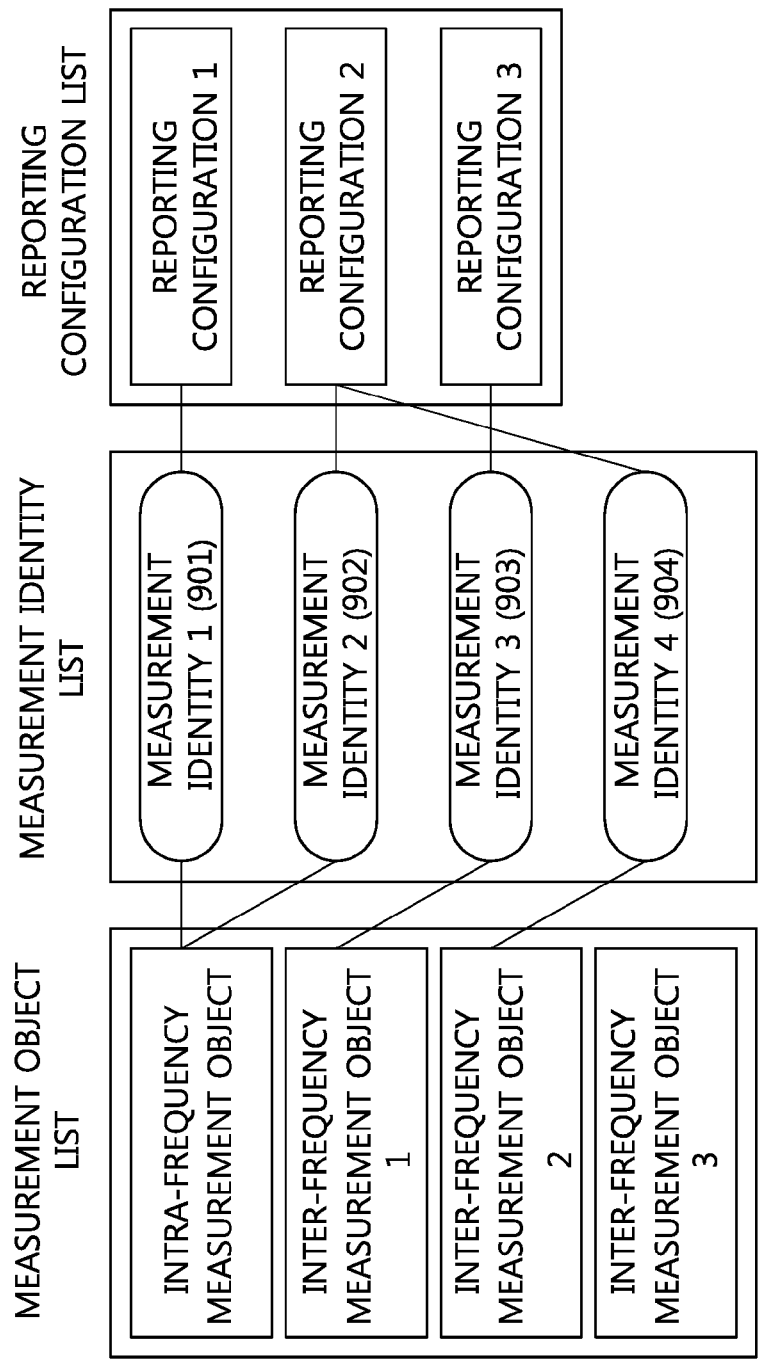
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier1 901, and associates the intra-frequency measurement object with a reporting configuration 2. The UE performs intra-frequency measurement. The reporting configuration 2 is used to determine a reporting format and a criterion for reporting a measurement result.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
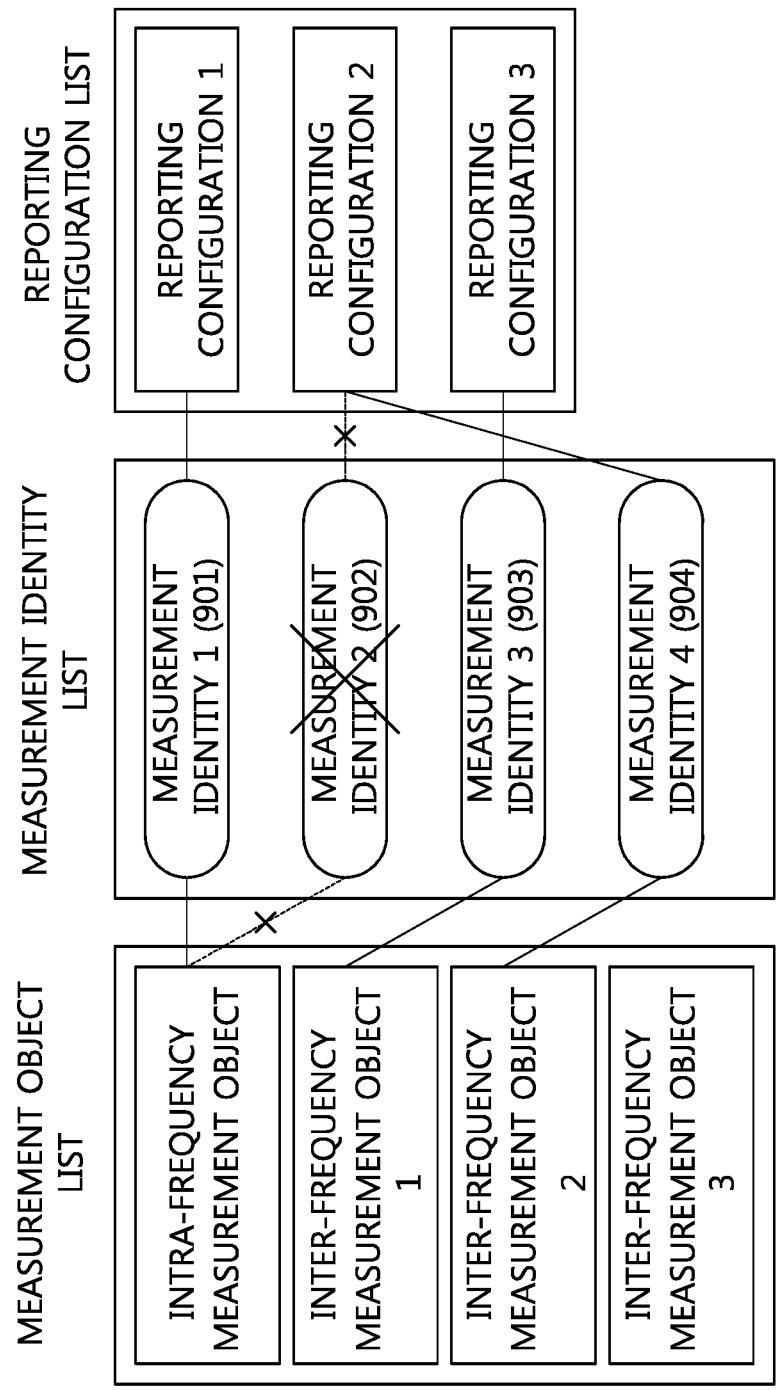
FIG. 10 shows an example of deleting a measurement identity.

FIG. 10 shows an example of deleting a measurement identity. When a measurement identity2 902 is deleted, measurement on a measurement object associated with the measurement identity2 902 is suspended, and a measurement report is not transmitted. A reporting configuration or a measurement object associated with the deleted measurement identity may not be modified.

Figure 11:
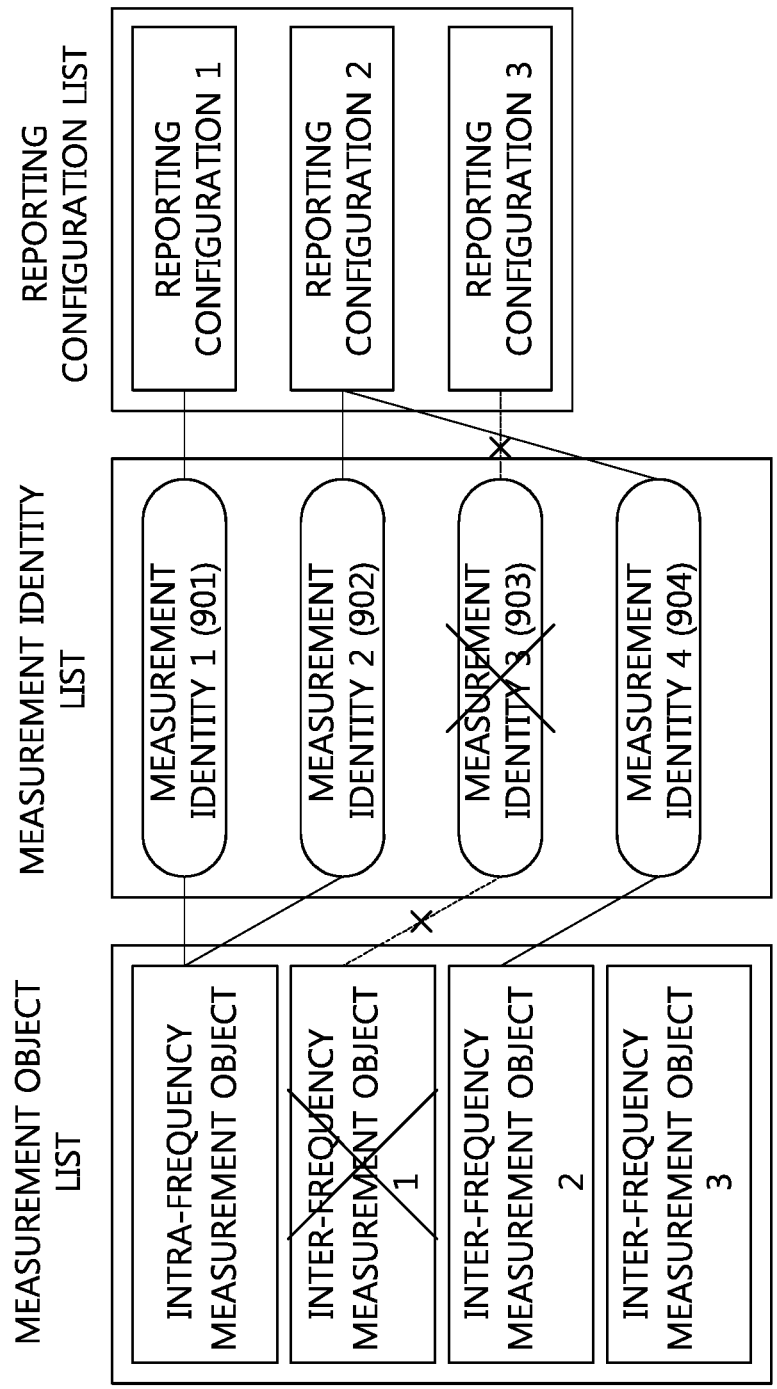
FIG. 11 shows an example of deleting a measurement object.

FIG. 11 shows an example of deleting a measurement object. When an inter-frequency measurement object 1 is deleted, a UE also deletes an associated measurement identifier3 903. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

A Public Land Mobile Network (PLMN) is a network deployed and operated by mobile network operator(s). Each mobile network operator runs one or more PLMNs. Each PLMN can be identified with the Mobile Country Code (MCC) and the Mobile Network Code (MNC). The PLMN information of a cell is broadcast in the system information.

For PLMN selection, cell selection, and cell reselection, several types of PLMNs are considered by UE.

Home PLMN (HPLMN): The PLMN whose MCC and the MNC matches the MCC and the MNC of the UE's IMSI.

Equivalent HPLMN (EHPLMN): Any PLMN that is equivalent to HPLMN.

Registered PLMN (RPLMN): The PLMN for which location registration is successful.

Equivalent PLMN (EPLMN): Any PLMN that is equivalent to RPLMN.

Each mobile service subscriber has a subscription with a HPLMN. When the normal service is provided to UE by the HPLMN or the EHPLMN, the UE is not in a roaming state. On the other hand, when the service is provided to UE by the PLMN other than HPLMN/EPHPLN, the UE is in a roaming state, and the PLMN is called Visited PLMN (VPLMN).

When UE is powered on, PLMN selection is triggered. For the selected PLMN, UE attempts to register the selected PLMN. If the registration is successful, the selected PLMN becomes RPLMN. Network can signal to the UE a list of PLMN for which the UE considers those PLMNs in the PLMN list equivalent to its RPLMN. The PLMN equivalent to RPLMN is called EPLMN. The UE that registered with network should be reachable by the network at any time. If the UE is in ECM-CONNECTED (equivalently RRC_CONNECTED), the network is aware of the cell the UE is being served. However, while the UE is in ECM-IDLE (equivalently RRC_IDLE), the context of the UE is not available at the eNB but stored in the MME. In this case, the location of the UE in ECM-IDLE is only known to the MME at the granularity of a list of Tracking Area (TA)s. A single TA is identified by the Tracking Area Identity (TAI) which consists of the PLMN Identity the tracking area belongs to and the Tracking Area Code (TAC) that uniquely represents the TA in the PLMN.

The following description is about an accessibility measurement.

There are many aspects regarding measuring the non-availability of a connection for a UE. It deals with both coverage of common channels and connection procedures. To inform the non-availability of a connection to network and thus to help parameter optimization in order to increase the availability of a connection, UE performs accessibility measurements when connection establishment fails. For the accessibility measurements, UE performs logging of the followings:

Time stamp is included, which is derived by using a relative timer counting the time between failure and reporting. The storing time for accessibility measurements should be 48 hours.

Reporting the Number of Random access preambles transmitted shall be supported.

The indication whether maximum power level was reached should be included.

The indication whether contention was detected during the random access procedures for connection establishment.

The following description is about an H(e)NB.

In addition to a mobile network vendor, a mobile communication service can be provided via an eNB of an individual user or a specific vendor or a group owner. Such an eNB is called a home node B (HNB) or a home eNB (HeNB). Hereinafter, both the HNB and HeNB are collectively referred to as the HeNB. The HeNB is basically used to provide specialized services only to members of a closed subscriber group (CSG). However, according to operation mode setting of the HeNB, the services may also be provided to other users in addition to the users of the CSG.

Figure 12:
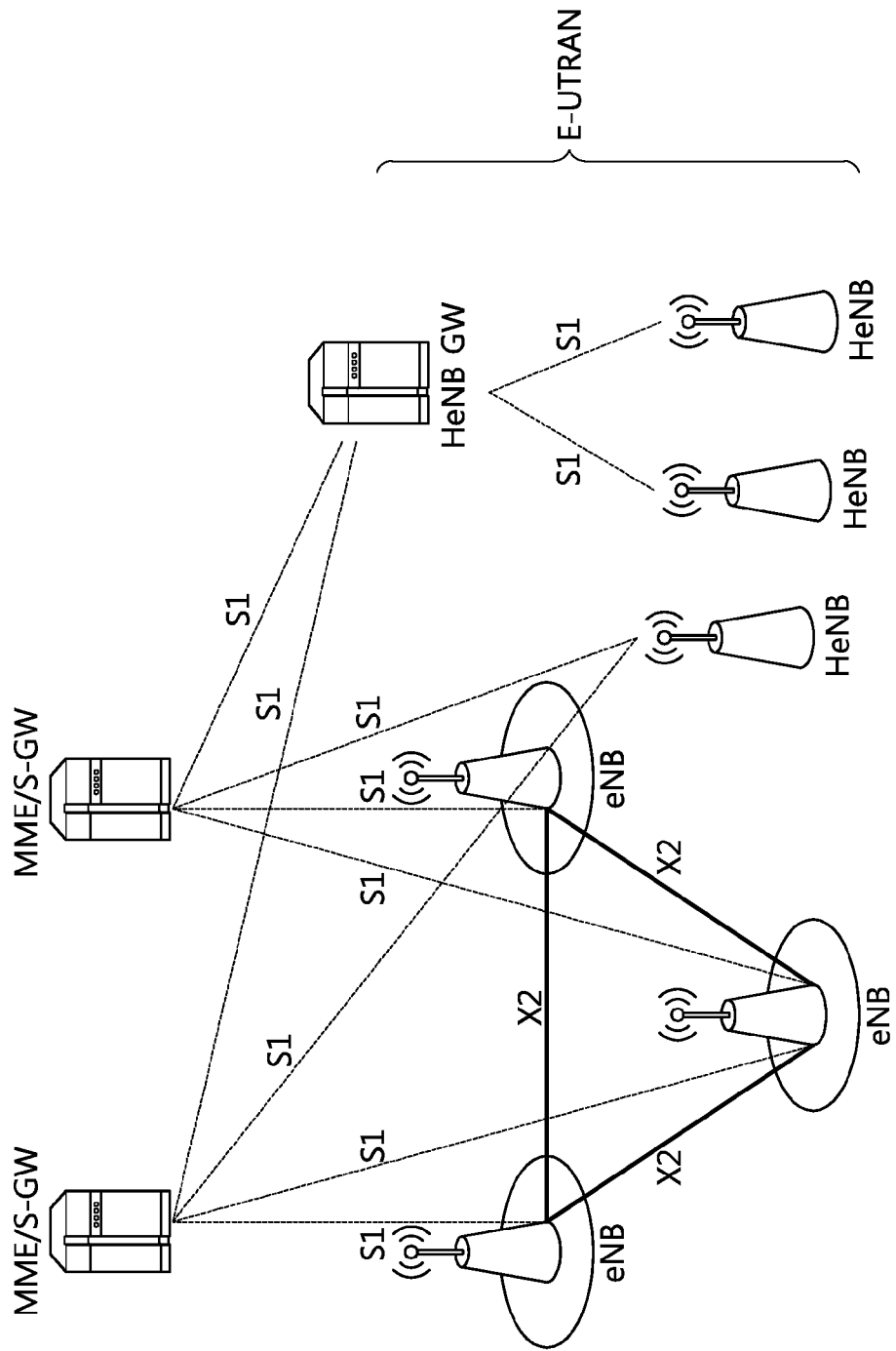
FIG. 12 shows an example of a wireless communication system for operating a HeNB.

FIG. 12 shows an example of a wireless communication system for operating a HeNB.

Referring to FIG. 12, a home eNB gateway (HeNB GW) can be operated to provide a service to the HeNB as described above. HeNBs are connected to an EPC directly or via the HeNB GW. An MME regards the HeNB GW as a typical eNB. Further, the HeNB regards the HeNB GW as the MME. Therefore, the HeNB and the HeNB GW are connected by means of an S1 interface, and also the HeNB GW and the EPC are connected by means of the S1 interface. Furthermore, even in a case where the HeNB and the EPC are directly connected, they are connected by means of the S1 interface. A function of the HeNB is almost similar to a function of the typical eNB.

In general, the HeNB has radio transmission output power lower than that of an eNB owned by a mobile network vendor. Therefore, in general, the coverage provided by the HeNB is smaller than the coverage provided by the eNB. Due to such characteristics, a cell provided by the HeNB is often classified as a femto cell in contrast to a macro cell provided by the eNB from the perspective of the coverage. Meanwhile, from the perspective of provided services, when the HeNB provides the services only to the CSG group, a cell provided by this HeNB is referred to as a CSG cell.

Each CSG has its own identity which is called a CSG identity (CSG ID). The UE may have a list of CSGs to which the UE belongs as a member thereof, and this CSG list may be referred as a CSG white list. The CSG white list may change by a request of the UE or by a command of the network. In general, one HeNB can support one CSG.

The HeNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell.

It is not always required for the HeNB to allow access of the CSG UE. Based on the configuration setting of the HeNB, access of a non-CSG member UE may also be allowed. According to the configuration setting of the HeNB, access is allowed for a different UE. Herein, the configuration setting denotes setting of an operation mode of the HeNB. The operation mode of the HeNB is classified into three modes described below, depending on a type of UE for which a service is provided.

1) Closed access mode: A mode in which services are provided to particular CSG members only. The HeNB provides a CSG cell.

2) Open access mode: A mode in which services are provided without any restriction of particular CSG members, similarly to the typical eNB. The HeNB provides a typical cell instead of a CSG cell.

3) Hybrid access mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HeNB notifies to the UE whether a cell serviced by the HeNB is a CSG cell or a typical cell, and thus allows the UE to know whether the UE can access to the cell. When operating in the closed access mode, the HeNB broadcasts that the cell serviced by the HeNB is the CSG cell by using system information. When operating in the open access mode, the HeNB broadcasts that the cell serviced by the HeNB is not the CSG cell by using the system information. In this manner, the HeNB inserts a CSG indicator into the system information, wherein the CSG indicator indicates whether the cell being serviced by the HeNB is the CSG cell or not. For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell provided by the eNB from the typical cell, the typical eNB may also transmit the CSG indicator so as to allow the UE to know that the cell type provided by the eNB is the typical cell. The typical eNB may allow the UE to know that the cell type provided by the eNB is the typical cell by not transmitting the CSG indicator. The CSG-related parameters transmitted by the corresponding cell for each cell type are represented in Table 2. Subsequently, a type of UE for which access is accepted is represented in Table 3.

TABLE 2

|  | CSG cell | Typical cell |
|---|---|---|
| CSG Indicator | 'CSG Cell' is indicated | 'Non-CSG cell' is indicated, or not transmitted |
| CSG ID | Supported CSG ID is transmitted | Not transmitted |

TABLE 3

|  | CSG cell | Typical cell |
|---|---|---|
| UE not supporting CSG | Access denied | Access accepted |
| Non-CSG member UE | Access denied | Access accepted |
| CSG member UE | Access accepted | Access accepted |

Next, a cell re-selection process in relation to a CSG cell will be described. The CSG cell is a cell for providing a better service to a corresponding CSG member UE. Thus, when the UE is camped on in the CSG cell, it may not be desirous in terms of quality of service (QoS) if the UE discovers an inter-frequency having frequency priority higher than that of a serving frequency and re-selects a cell of the inter-frequency, In order to prevent the UE from unconditionally re-select a cell by inter-frequency having frequency priority higher than that of the serving frequency when the UE is camped on in the CSG, it is assumed that when a CSG cell of a certain frequency is best ranked according to a cell re-selection evaluation reference in the frequency, frequency priority of the corresponding frequency is higher than that of other frequencies. In this manner, when the UE designates frequency priority higher than frequency priority that may be designated by a network with respect to a particular frequency, such frequency priority is called implicit highest priority. By doing that, it helps the UE is camped on in the CSG cell, while the rule in the existing cell selection that frequency priority is first considered when the UE performs cell re-selection. If the UE in the CSG cell re-selects a non-CSG cell of the corresponding frequency, the UE may withdraw the implicit highest priority assumption with respect to the corresponding frequency and uses the frequency priority value transferred from the network in evaluating cell re-selection. If a different CSG cell best linked in a frequency having the same frequency priority is discovered when the UE is camped on in the CSG cell, whether the UE re-selects the CSG cell or whether the UE remains in the CSG cell in which it is currently camped on follows an implementation of the UE.

From UE perspective, the list of CSGs to which the UE is considered CSG member should be managed. The list of CSGs is referred to as CSG white-list for the UE. Operator should also manage CSG subscription data of its subscribers.

The CSG subscription data of UEs are stored in Home Subscriber Server (HSS). The CSG subscription data is transferred to MME when UE registers with network. For a UE, the CSG subscription data is stored in Universal Subscriber Identity Module (USIM) of the UE.

Figure 13:
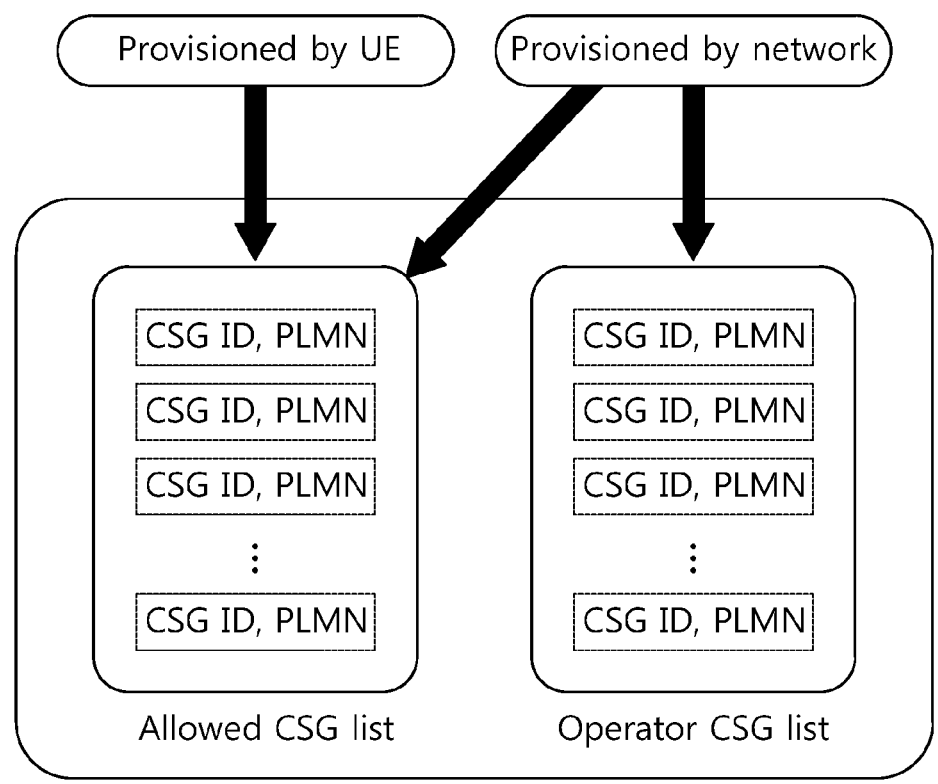
FIG. 13 illustrates an example of CSG white-list structure.

FIG. 13 illustrates an example of CSG white-list structure.

As shown in the FIG. 13, CSG white-list consists of 'Allowed CSG list' and 'Operator CSG list'. The Allowed CSG list can be provisioned by both UE and network, while the Operator CSG list is only provisioned by network. CSG provisioning can be carried out by Open Mobile Alliance Device Management (OMA DM) procedures or by Over-The-Air (OTA) technologies. NAS procedures are also used for CSG provisioning in case of manual CSG selection, where CSG white-list can be updated during e.g. attach or tracking area update procedure.

Both "Allowed CSG list" and "Operator CSG list" consist of a list of entries which of each comprises a CSG identity and a PLMN identity that is associated with the CSG identity in the same entry. The UE considers that the CSG identity stored in CSG white-list is valid only within the scope of associated PLMN.

MDT (Minimization of Driving Tests) will be described.

Instead of performing drive test to measure quality of a cell by using a vehicle conventionally by business operators to optimize cell coverage, MDT allows a UE to perform measurement and report the result. The coverage varies according to a location of a base station, disposition of surrounding buildings, and a usage environment of a user. Thus, a business operator is required to periodically perform drive testing, which incurs a great amount of costs and resources. Thus, in order to overcome such shortcomings, MDT allowing a business operator to measure coverage by using a terminal is proposed.

A business operator may create a coverage map indicating service availability and a distribution of quality of service over the general regions in which the business operator provides services by synthesizing MDT measurement values received from several UEs, and utilize the same for network operation and optimization. For example, when the business operator receives a report on a coverage issue of a particular area from a UE, the business operator increases transmission power of a BS providing a service of the corresponding area to extend coverage of the corresponding area cell. Through this method, time and costs for network optimization can be minimized.

MDT was made based on a framework having a tracking function as one of tools of an operator for OAM (operation, administration, and maintenance). The tracing function provides ability to an operator to trace and log behaviors of a UE, making it possible to determine a major cause of a defective function of a UE. Traced data is collected by a network, which is called a TCE (trace collection entity). The operator uses data collected by the TCE for the purpose of analysis and evaluation. The tracing function used for MDT includes signaling based on the tracing function and a management based on the tracing functions. The tracing function-based signaling is used to activate an MDT operation toward a particular UE, while the tracing function-based management is used to activate an MDT operation without being limited to a particular UE.

MDT may be divided into two types of MDTs; a logged MDT and an immediate MDT according to whether or not a UE reports measured or stored log data in non-real time or in real time. The logged MDT is a method that a UE performs MDT measurement, logs corresponding data, and transmits the same to a network later. Meanwhile, the immediate MDT is a method that a UE performs MDT measurement and immediately transmits corresponding data to a network. According to the logged MDT, the UE performs MDT measurement in an RRC idle state, while according to the immediate MDT, the UE performs MDT measurement in an RRC connected state.

Figure 14:
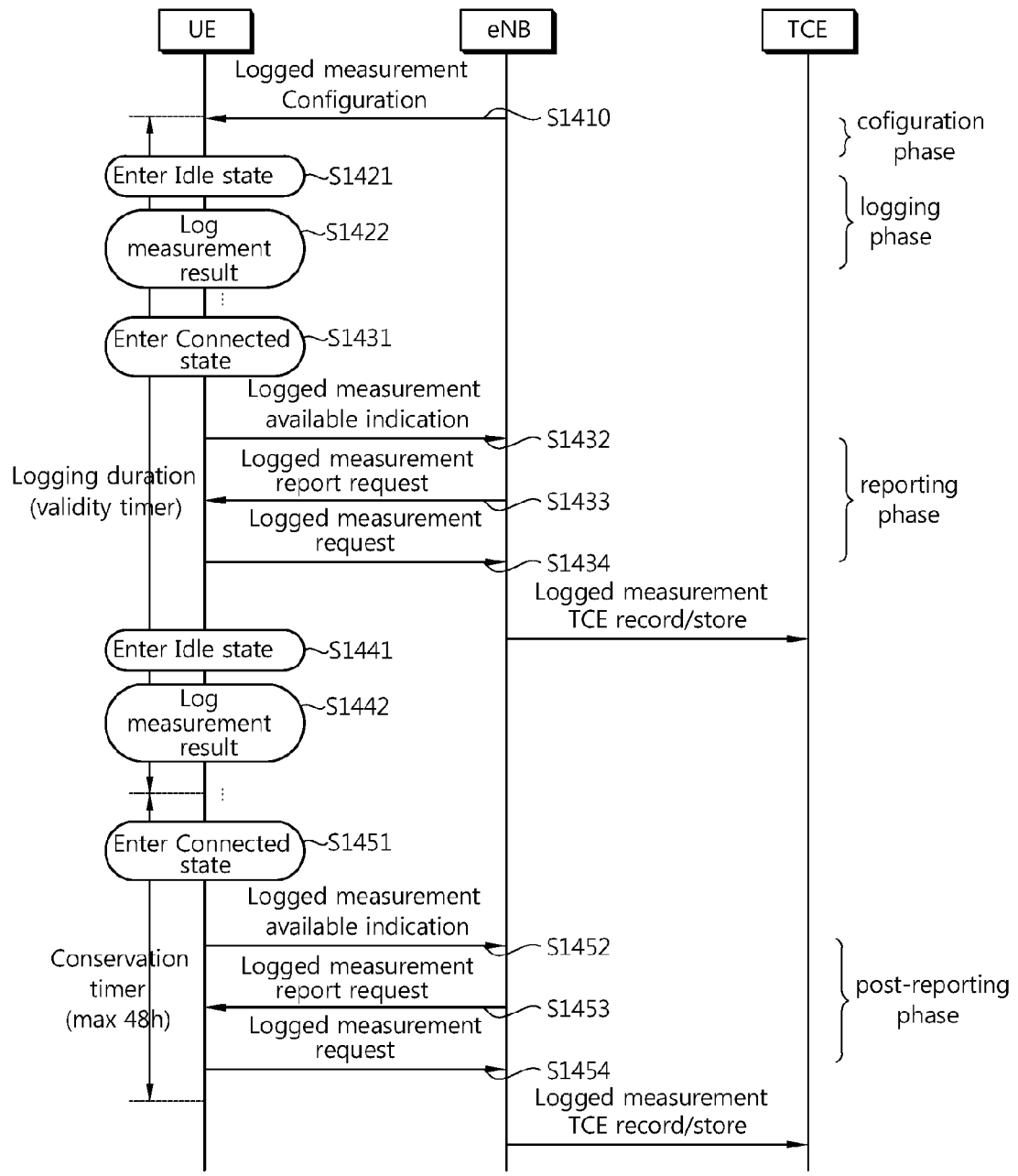
FIG. 14 is a flow chart illustrating a method for performing logged MDT.

FIG. 14 is a flow chart illustrating a method for performing logged MDT.

Referring to FIG. 14, a UE receives a logged measurement configuration (S1410). The logged measurement configuration may be included in an RRC message and transmitted on a downlink control channel. The logged measurement configuration may include at least one of reference time information, a logging duration, a logging interval, information regarding an area configuration. The logging interval indicates an interval storing a measurement result. The logging duration indicates a duration in which a UE performs logged MDT. The reference time indicates a time as a reference of a continuation time during the logged MDT is performed. The area configuration indicates an area required for the UE to perform logging.

Meanwhile, when the UE receives the logged measurement configuration, it starts a validity timer. The validity timer refers to a lifetime of the logged measurement configuration, which may be specified by information regarding the logging duration. The duration of the validity timer may indicate validity of measurement results of the UE, as well as the valid lifetime of the logged measurement configuration.

The procedure in which the UE configures the logged measurement and various procedures are performed is called a configuration phase.

When the UE enters an RRC idle state (S1421), the UE loges the measurement result while the valid timer is being driven (S1422). The measurement result value may include RSRP, RSRQ, RSCP (received signal code power), Ec/No, or the like. Hereinafter, measurement result-logged information is called logged measurements. A temporal interval during which the UE logs the measurement results at least one or more times is called a logging phase.

Performing of logged MDT based on the logged measurement configuration by the UE may vary according to a location of the UE.

Figure 15:
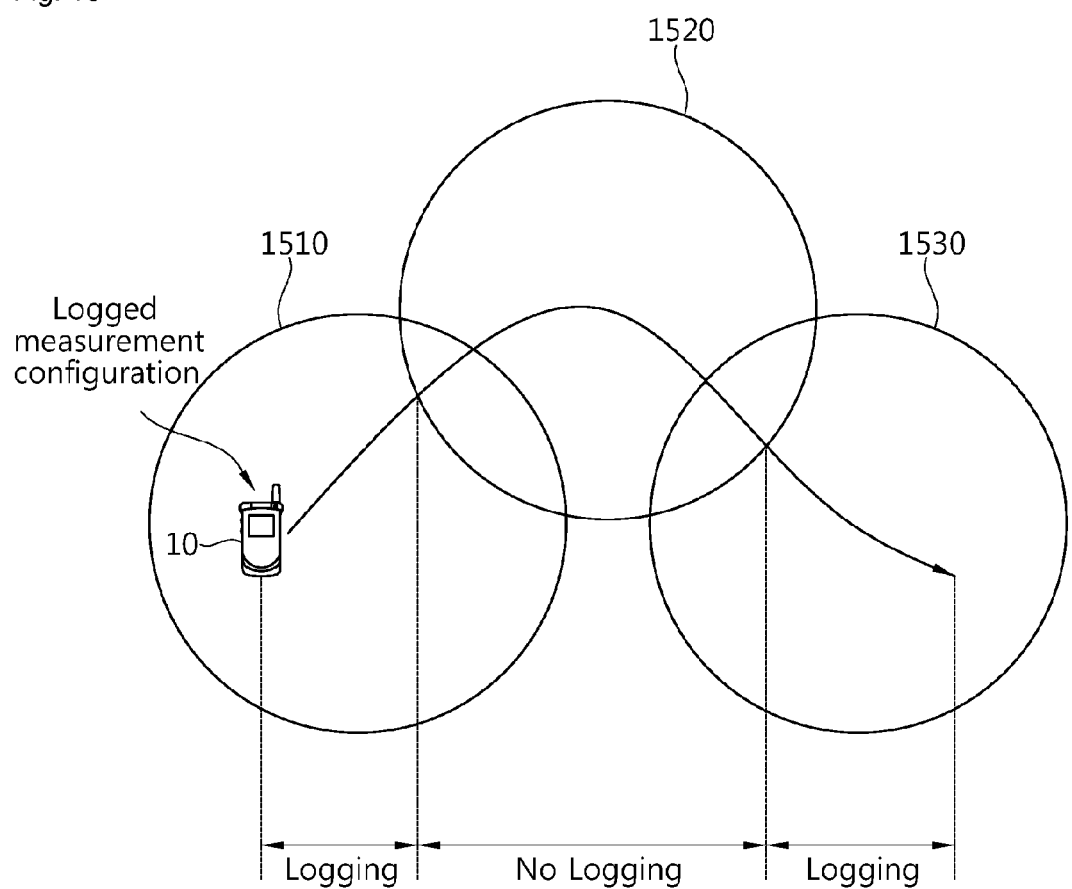
FIG. 15 illustrates logged MDT according to logging areas.

FIG. 15 illustrates logged MDT according to logging areas.

A network may configure a logging area, an area to which a UE should log. The logging area may be expressed as a cell list or a tracking area/location area list. In case that a logging area is set for the UE, when the UE moves out of the logging area, logging is stopped.

Referring to FIG. 15, a first area 1510 and a third area 1530 are areas set as logging areas, and a second area 1520 is an area in which logging is not allowed. The UE performs logging in the first area 1510, while the UE does not perform logging in the second area 1520. When the UE moves from the second area 1520 to the third area 1530, the UE performs logging again.

Figure 16:
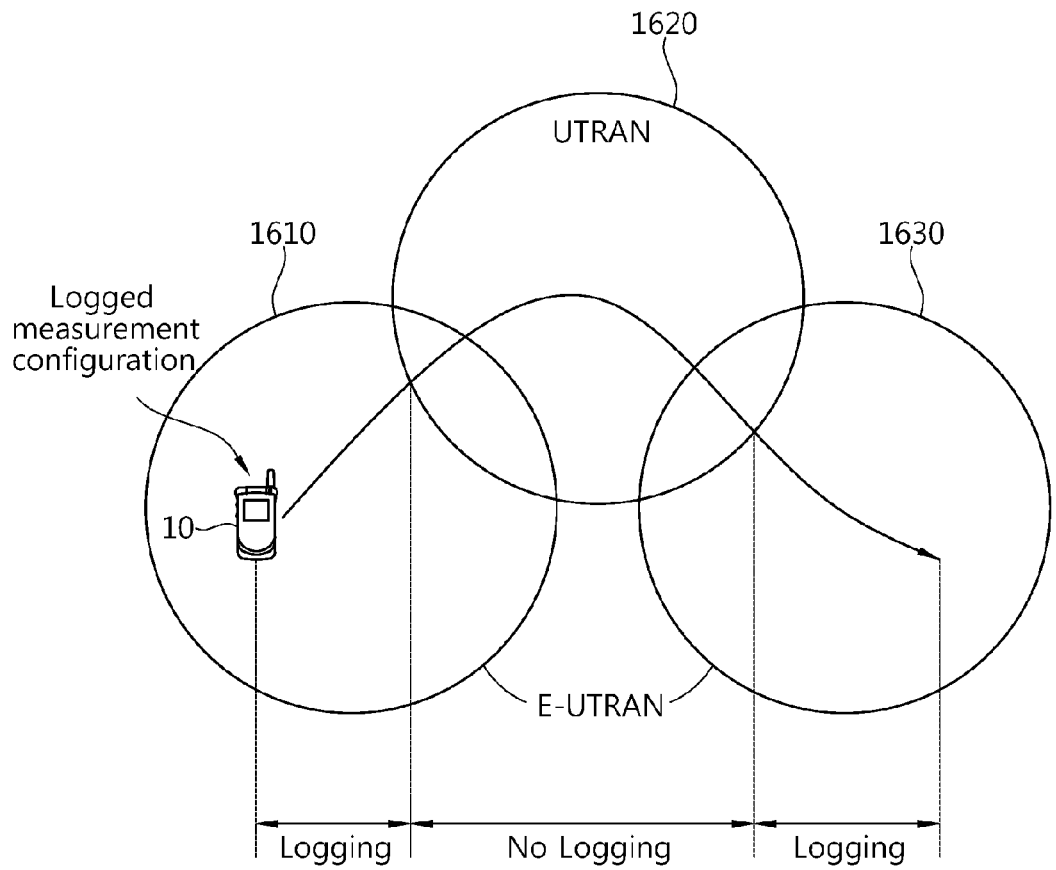
FIG. 16 illustrates logged MDT according to a change in RAT.

FIG. 16 illustrates logged MDT according to a change in RAT.

A UE performs logging only when it camps on in an RAT in which a logged measurement configuration is received, and stops logging in a different RAT. The UE may log cell information of a different RAT other than the RAT in which the UE is camped on.

A first area 1610 and a third area 1630 are E-UTRAN areas, and a second area 1620 is a UTRAN area. The logged measurement configuration is received from the E-UTRAN. When the UE enters the second area 1620, it does not perform MDT measurement.

Referring back to FIG. 14, the UE enters the RRC-connected state (S1431), and when there is a logged measurement to be reported, the UE informs the BS that there is a logged measurement to be reported (S1432). The UE may inform the BS that there is a logged measurement when an RRC connection is established, when an RRC connection is re-established, or when an RRC connection is reconfigured. Also, when the UE performs handover, the UE may inform a handover target cell that there is a logged measurement. When the UE informs the BS that there is a logged measurement, the UE may include a logged measurement availability indicator as indication information indicating that there is a logged measurement in an RRC message to be transmitted to the BS, and transmits the same. The RRC message may be an RRC connection configuration complete message, an RRC connection reestablishment complete message, an RRC reconfiguration complete message, or a handover complete message.

When the BS receives a signal indicating that there is a logged measurement from the UE, the BS requests the UE to report on the logged measurement (S1433). In requesting the UE to report on the logged measurement, the BS may include a logged measurement report request parameter regarding corresponding instruction information in an RRC message and transmit the same. The RRC message may be a UE information request message.

When UE receives the request for reporting the logged measurement from the BS, the UE reports the logged measurement to the BS (S1434). When reporting the logged measurement to the BS, the UE may include logged measurement report including logged measurements in an RRC message and transmit the same. The RRC message may be a UE information report message. When reporting the logged measurement, the UE may report the entire logged measurements of the UE at the timing of report to the BS or some of the logged measurements to the BS. When the UE reports some of the logged measurements, the reported logged measurements may be discarded.

The process in which the UE informs the BS that there is a logged measurement, receives a request for reporting the logged measurement from the BS, and the UE reports the logged measurement to the BS is called a reporting phase.

While the logged MDT is being performed, the UE largely measures a radio environment. The MDT measurement may include a cell identity, a signal quality and/or signal strength of a cell. The MDT measurement may include a measurement time and a measurement place. A table below illustrates content the UE logs.

TABLE 4

| Parameter(set) | Description |
| --- | --- |
| Serving cell identity | global cell identity of serving cell |
| Measured results of serving cell | Measured Reference Signal Received Power (RSRP) of serving cell<br>Measured Reference Signal Received Quality (RSRQ) of serving cell |
| Measured results of neighbor cell | Cell Identities of measured E-UTRA cells, Measured results of E-UTRA cells<br>Cell Identities of measured UTRA cells, Measured results of UTRA cells<br>Cell Identities of measured GERAN cells, Measured results of GERAN cells<br>Cell Identities of measured CDMA 2000 cells, Measured results of CDMA 2000 cells |
| Time stamp | The moment of logging measurement results, calculated as {current time minus absoluteTimeStamp} in seconds |
| Location information | Detailed location information at the moment of logging |

Information logged at each different logging timing may be stored such that it is discriminated by different log entries as follows.

Figure 17:
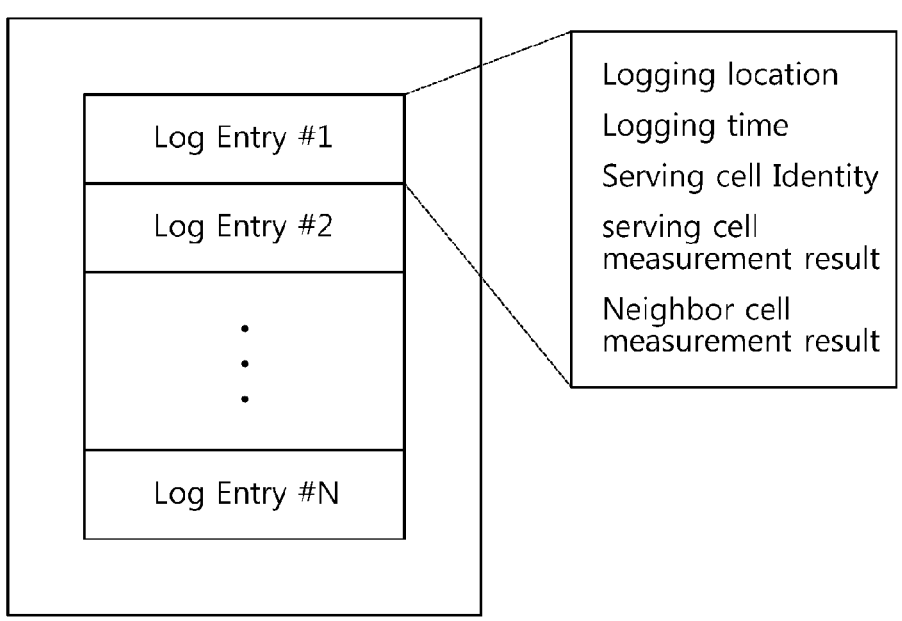
FIG. 17 illustrates logged measurement.

FIG. 17 illustrates logged measurement.

The logged measurement includes one or more log entries.

The log entries include a logging location, a logging time, a serving cell identity, a serving cell measurement result, and a neighbor cell measurement result.

The logging location indicates a location measured by the UE. The logging time indicates a time measured by the UE. Information logged at a different logging time is stored in a different log entry.

The serving cell identity may include a cell identity in a layer 3, which is called a GCI (Global Cell Identity). The GCI is a set of a PCI (Physical Cell Identity) and a PLMN.

Meanwhile, the UE may analyze indicators related to performance of the UE in addition to a radio environment and perform logging. For example, the indicators may include throughput, an erroneous transmission/reception rate, and the like.

Referring back to FIG. 14, the foregoing logging phase and the reporting phase may exist within the logging duration a plurality of times (S1441, S1442).

When the BS receives a report on the logged measurement, the BS may record/store it in a TCE.

After the validity timer expires, namely, when a logging duration has lapsed, if the UE has a logged measurement not reported yet, the UE may perform a procedure for reporting it to the BS. A procedure in which various procedures therefor are performed is called a post-reporting phase.

When the logging duration is terminated, the UE discards the logged measurement configuration and starts a conservation timer. After the logging duration is terminated, the UE stops the MDT measurement. However, an already logged measurement is not discarded but maintained. The conservation timer indicates a lifetime of the remaining logged measurement.

When the UE enters the RRC-connected state before the conservation timer expires (S1451), the UE may report the logged measurement not reported yet to the BS. In this case, the foregoing procedure for reporting the logged measurement may be performed (S1452, S1453, S1454). When the conservation timer expires, a remaining logged measurement may be discarded. When the BS receives a report on the logged measurement, the BS may record/store it in the TCE.

The conservation timer may be previously set as a predetermined value in the UE. For example, a value of the conservation timer may be 48 hours. Alternatively, the value of the conservation timer may be included in the logged measurement configuration and transferred to the UE, or may be included in a different RRC message and transferred to the UE.

Meanwhile, when a new logged measurement configuration is transferred to the UE, the UE may update an existing logged measurement configuration with the newly obtained logged measurement configuration. In this case, the validity timer may start again from a point in time at which the logged measurement configuration is newly received. Also, the logged measurement based on the previous logged measurement configuration may be discarded.

Figure 18:
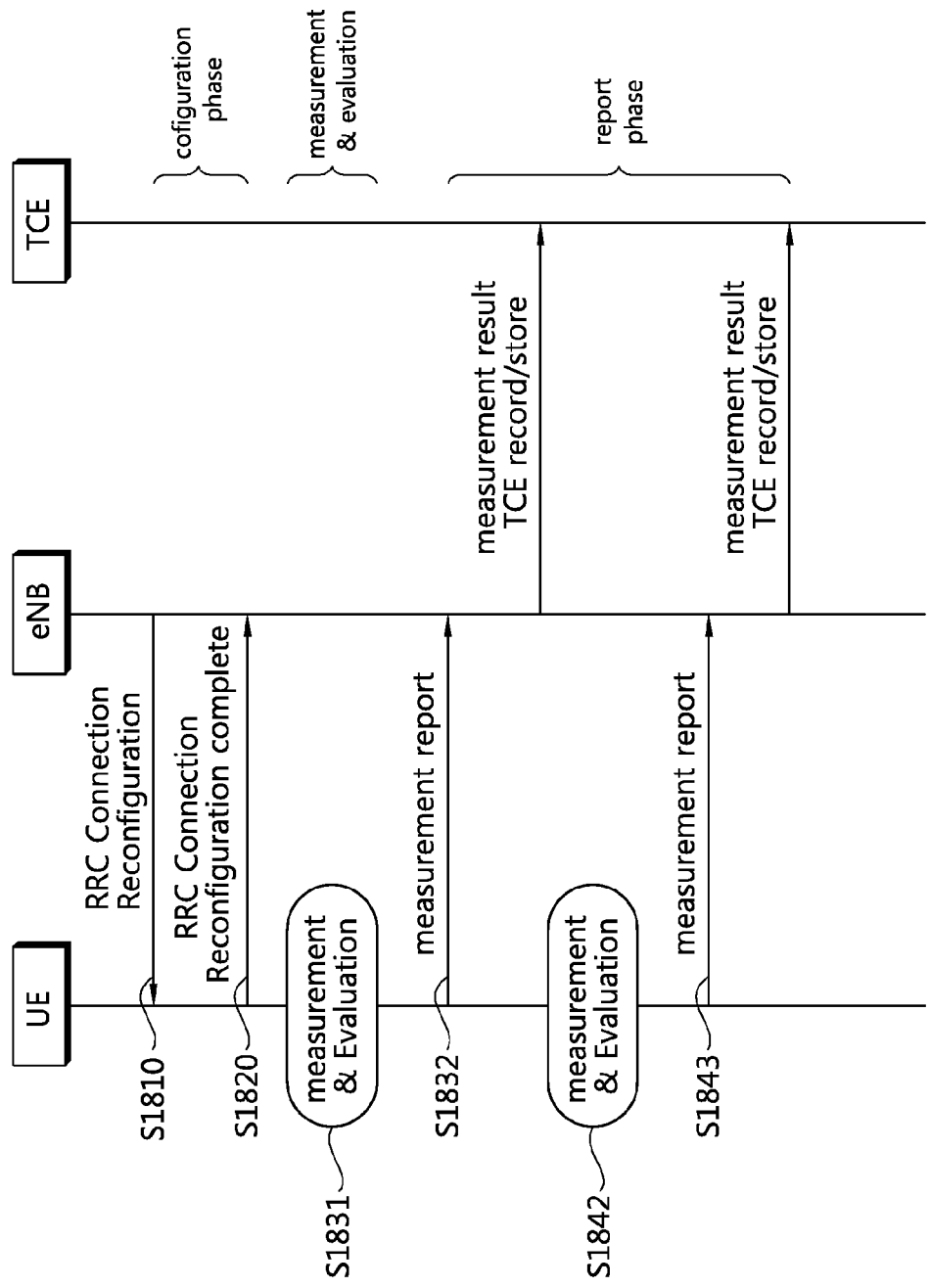
FIG. 18 illustrates the immediate MDT.

FIG. 18 illustrates the immediate MDT. The immediate MDT is based on an RRM (radio resource management) measurement and report mechanism, and in the event of additional measurement report, information regarding a location is added and reported to the BS.

Referring to FIG. 18, the UE receives an RRC connection reconfiguration message (S1810), and transmits an RRC connection reconfiguration complete message (S1820). Through this, the UE enters an RRC-connected state. The UE may receive a measurement configuration by receiving the RRC connection reconfiguration message. The measurement configuration in the illustration of FIG. 18 is received through an RRC connection reconfiguration message, but it may also be included in a different RRC message and transmitted.

The UE performs a measurement and evaluation in the RRC-connected state (S1831) and reports the measurement result to the BS (S1832). In the immediate MDT, the measurement result may be able to provide accurate location information, if possible, as in the illustration of the GNSS (global navigation satellite system) location information. For a location measurement such as an RF fingerprint, neighbor cell measurement information that may be used for determining a location of the UE may also be provided.

In FIG. 18, it can be seen that, even after the measurement and evaluation (S1831) and report (S1832) performed first, the UE performs measurement and evaluation (S1841) and reports the measurement result to the BS (S1842). This is a significant difference of the immediate MDT over the logged MDT.

In general, a CSG cell and a macro cell may be simultaneously operated at a predetermined frequency. A frequency in which only a CSG cell exists is called a CSG dedicated frequency, while a predetermined frequency in which a CSG cell and a macro cell exist simultaneously is called a mixed carrier frequency. A network may reserve a predetermined physical layer cell identity in the mixed carrier frequency, for a CSG cell. The physical layer cell identity is called a PCI (Physical Cell Identity) in the E-UTRAN, and is called a PSC (Physical scrambling code) in the UTRAN. For the description purpose, the physical layer cell identity will be expressed as a PCI.

The CSG cell provides information regarding a PCI reserved for the CSG in a current frequency, through system information. Upon receiving the information, when the UE discovers a certain cell in the corresponding frequency, the UE may be able to determine whether or not the cell is a CSG cell from the PCI of the cell. Utilization of the information by the UE will be described with respect to two cases of terminals as follows.

First, in case of a terminal that does not support a CSG related function or does not have a CSG list to which the UE belongs as a member, the UE may not need to regard a CSG cell as a selectable cell in the cell selection/re-selection/handover process. In this case, the UE checks only the PCI of the cell, and when the PCI is a PCI reserved as a CSG, the UE may immediately exclude the corresponding cell in the cell selection/re-selection/handover process. In general, a PCI of a certain cell may be immediately known in the process in which a physical layer of the UE checks the presence of a corresponding cell.

Second, in case of a UE that has a CSG list to which the UE belongs as a member, when the UE wants to know a list regarding adjacent CSG cells in the mixed carrier frequency, if the UE discovers only a cell having a PCI reserved for a CSG, it can know that the corresponding cell is a CSG cell, rather than checking CSG identifiers of system information of all the cells discovered in the entire PCI range one by one.

Information regarding a set of PCIs reserved for a CSG cell in a predetermined frequency may be called CSG PCI split information. The CSG PCI split information may indicate a range of the PCI reserved for a CSG cell. The CSG PCI split information may be effectively applied to a case that a current time is within a predetermined time (e.g., 24 hours) since the corresponding information has been received and the UE is camped on in the same PLMN as pPLMN in which the corresponding information was received.

Information regarding a set of PCIs reserved for a predetermined type of cell allowing only a particular UE to access, like the CSG PCI split information, may generally be called PCI split information. Namely, the PCI split information may be implemented to indicate a set of PCIs allocated to a predetermined type of cell allowing only a predetermined type of UE to access, as well as a CSG cell. The UE may primarily determine whether or not a corresponding cell is a cell the UE can access, by comparing the PCI split information and the PCI of the cell.

A UE not allowed to access a predetermined type of cell may receive PCI split information regarding a PCI set reserved for the predetermined type of cell. When the UE receives the logged measurement configuration to perform the logged MDT, the UE may omit measurement regarding a cell having a PCI included in the range of the PCI indicated by the PCI split information and exclude it from the cell reselection targets. As a result, the network may not obtain measurement results with respect to the predetermined type of cell from the UE.

Thus, even in a radio communication environment in which PCI split information is provided, the UE may be required to be allowed for measurement regarding a predetermined type in performing the logged MDT. Namely, the UE may be configured to determine whether to measure a predetermined type of cell based on the PCI split information according to whether or not the logged measurement configuration for performing logged MDT is received.

When a UE that does not support a predetermined type of cell or an operation related to the predetermined type of cell receives a logged measurement, whether to apply PCI split information differs in performing measurement and cell reselection.

1) The UE does not consider a cell having a PCI included in a PCI range indicated by the PCI split information, as a cell reselection target. Namely, the UE performs cell reselection based on PCI split information, and excludes a predetermined type of cell from the cell reselection targets.

2) The UE performs measurement on a cell having a PCI included in the PCI range indicated by the PCI split information, and logs the measurement result. Namely, the UE may exclude the PCI split information in measuring a cell. The UE attempts to detect a predetermined type of cell, and when a predetermined type of cell is detected, the UE performs measurement. When there is a measurement result regarding the predetermined type of cell, the UE logs the measurement result according to the logged measurement configuration.

In the above, the predetermined type of cell may be a cell determined through classification according to a size of the cell. For example, the predetermined type of cell may be a small cell, which may be a pico cell and/or a femto cell.

In the above, the predetermined type of cell may be a CSG cell. Hereinafter, a measurement method according to an embodiment of the present invention will be described by using a communication system in which a CSG cell exists as an example.

Figure 19:
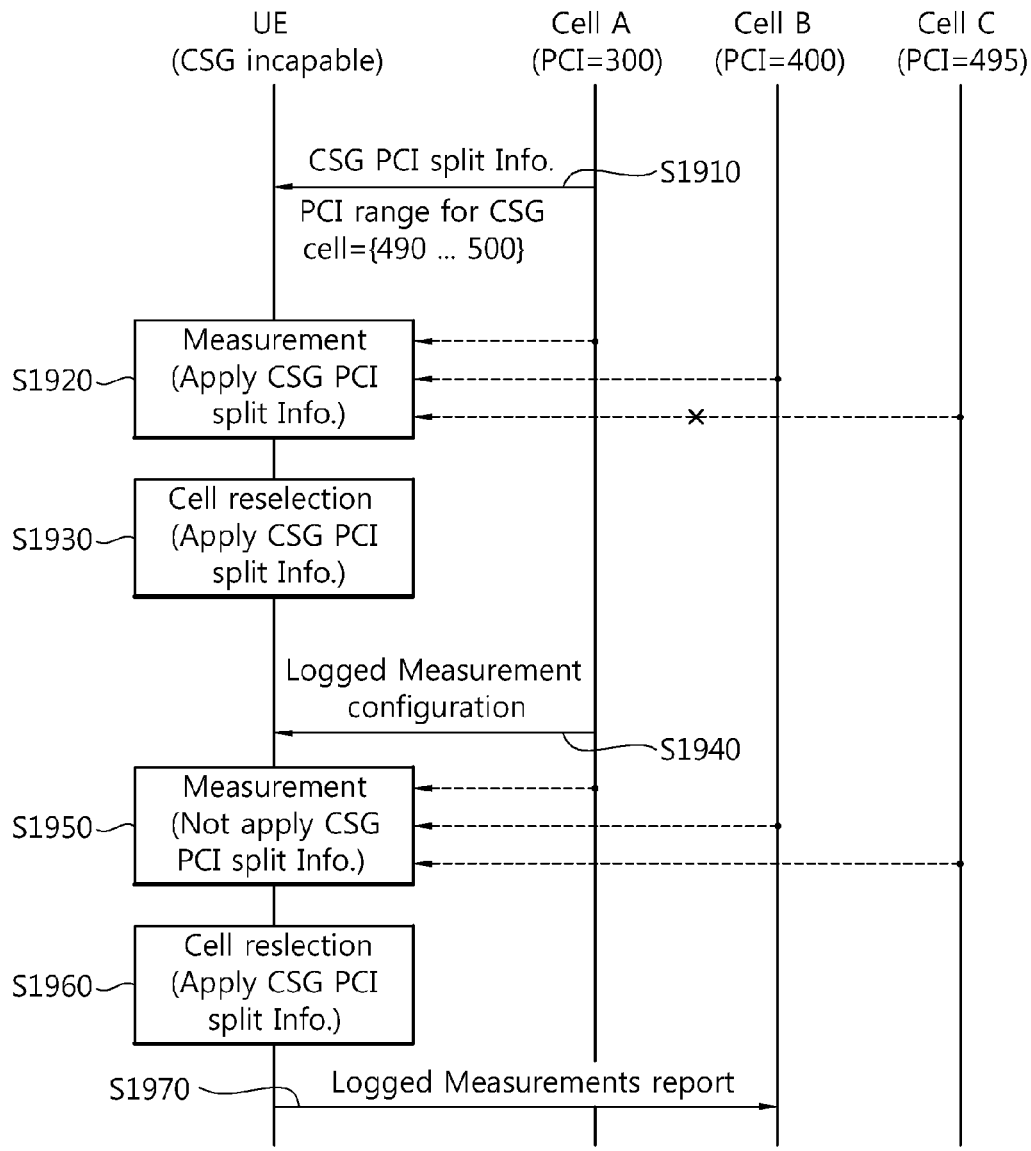
FIG. 19 illustrates an example of a measurement method according to an embodiment of the present invention.

FIG. 19 illustrates an example of a measurement method according to an embodiment of the present invention.

In the present embodiment, the UE as a CSG incapable UE, may be a UE not supporting a CSG or a UE having a CSG white list in an empty state.

The UE receives CSG PCI split information from a Cell A (S1910). The CSG PCI split information may indicate that a range of a PCI reserved for a CSG cell is PCI 490 to 500. The CSG PCI split information may be included in system information transmitted from the Cell A and transmitted.

The UE receives system information from the Cell A, Cell B, and Cell C. The system information transmitted from the respective cells may include a PCI of corresponding cells. The UE may determine whether or not the corresponding cells are CSG cells by comparing the PCIs of the corresponding cells and the PCI range for CSG cell of the CSG PCI split information.

A UE which has not received the logged measurement configuration performs measurement by applying the CSG PCI split information in measuring a cell (S1920). The UE performs measurement on a cell not included in the PCI range indicated by the CSG PCI split information. The UE performs measurement on the Cell A having a PCI 300 and the Cell B having a PCI 400. The UE determines a Cell having a PCI 495 as a CSG cell, and excludes it from the cell measurement.

The UE performs cell reselection by applying the CSG PCI split information (S1930). The UE may exclude a cell having a PCI included in the PCI range indicated by the CSG PCI split information from the targets for cell reselection. The UE excludes the Cell C having the PCI 495 from the targets for cell reselection. Thus, the UE may select one of the Cell A and Cell B as a target cell, and perform cell reselection. In the present embodiment, cell reselection is performed by using the Cell A as a target cell.

The UE receives a logged measurement configuration to perform logged MDT from the cell A (S1940). The UE may perform measurement and logging based on information included in the logged measurement configuration after entering an RRC idle state.

Upon receiving the logged measurement configuration, the UE performs measurement without applying the CSG PCI split information in measuring a cell (S1950). The UE may perform measurement even on the Cell C, a cell included in the PCI range indicated by the CSG PCI split information, as well as the Cell A and the Cell B, cells not included in the PCI range indicated by the CSG PCI split information, and log the measurement results. The UE measurement and logging may be performed based on information for measurement included in the logged measurement configuration.

Upon receiving the logged measurement configuration, the UE may perform cell reselection by applying the CSG PCI split information, like the case in which the logged measurement configuration is not received (S1960). The UE may exclude a cell having a PCI included in the PCI range indicated by the CSG PCI split information, from targets for cell reselection. The UE excludes the Cell C having a PCI 495 from the targets for cell reselection. Thus, the UE may select one of the Cell A and Cell B as a target cell, and perform cell reselection. In the present embodiment, cell reselection is performed by using the Cell B as a target cell.

Having entered the RRC idle state by performing cell reselection, the UE reports the logged measurement to the network (S1970). The UE reports measurement results obtained after receiving a logged measurement configuration, to the network. The logged measurement reported by the UE includes all of the measurement result with respect to the cell included in the PCI range indicated by the CSG PCI split information and the measurement result with respect to the cell not included in the PCI range.

According to an embodiment of the present invention, the UE may determine whether to apply the PCI split information in performing measurement based on whether or not the logged measurement configuration is received. Even when a particular type of cell like a CSG cell is excluded from the cell reselection targets, the UE may measure the corresponding type of cell, log the measurement result, and report the same to a network. In the communication environment in which the particular type of cell is operated, the network may obtain a measurement result with respect to the particular type of cell even through a logged MDT operation performed by a UE not supporting the particular type of cell. The network may optimize the operation based thereon, and provide an enhanced service.

Figure 20:
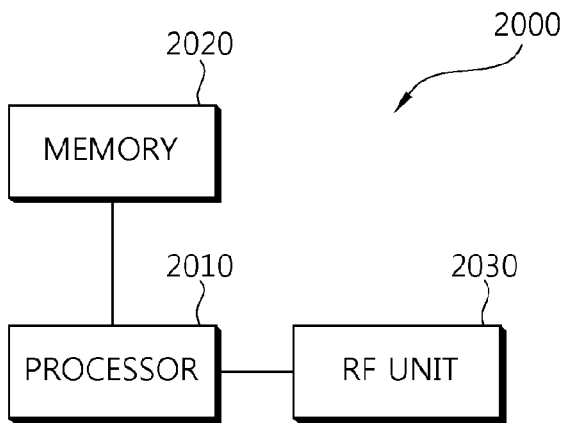
FIG. 20 is a block diagram of a wireless apparatus implementing an embodiment of the present invention.

FIG. 20 is a block diagram of a wireless apparatus implementing an embodiment of the present invention. The apparatus implements an operation of the UE according to the foregoing embodiment with reference to FIG. 19.

The wireless apparatus 2000 includes a processor 2010, a memory 2020, and an RF unit 2030. The processor 2010 implements the proposed function, process and/or method. The processor 2010 may be configured to receive PCI split information from a network and receive system information including a PCI from a cell. The processor 2010 may be configured to determine whether to measure a particular cell based on the PCI split information and the PCI of the cell. The processor 2010 may be configured to determine whether to consider a particular cell as a target of cell reselection based on the PCI split information and the PCI of the cell. The processor 2010 may determine whether to measure a particular type of cell based on whether or not a logged measurement configuration is received. The processor 2010 may be configured to implement the foregoing embodiment with reference to FIG. 19.

The RF unit 2030 may be connected to the processor 2010 to transmit and receive a radio signal.

The processor 2010 and the RF unit 2030 may be implemented to transmit and receive a radio signal according to one or more communication standards. The RF unit 2030 may include one or more transceivers to transmit and receive a radio signal.

The processor may include an ASIC (Application-Specific Integrated Circuit), a chip set, a logical circuit and/or a data processor. The memory may include a ROM (Read-Only Memory), a RAM (Random Access Memory), a flash memory, a memory card, a storage medium, and/or any other storage devices. The RF unit may include a baseband circuit for processing a radio signal. When the embodiments are implemented by software, the foregoing techniques may be implemented by modules (processes, functions, or the like) performing the foregoing functions. The modules may be stored in the memory and executed by the processor. The memory may be provided within or outside the processor, or may be connected to the processor through a well-known unit.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

The invention claimed is:

1. A method for measurement by a user equipment (UE) in a wireless communication system, the method comprising:
receiving cell identity split information indicating a cell identity set reserved for a predetermined cell type from a network;
determining whether to apply the cell identity split information in performing measurement; and
measuring at least one cell, wherein if the UE receives a logged measurement configuration including information regarding performing of logged minimization driving test (MDT), the measurement is performed without applying the cell identity split information, and when the UE does not receive the logged measurement configuration, the measurement is performed by applying the cell identity split information.

2. The method of claim 1, wherein the step of performing of the measurement based on the cell identity split information comprises:

comparing an identity of the at least one cell with the cell identity set indicated by the cell identity split information; and measuring at least one cell having the cell identity not included in the cell identity set among the at least one cell.

3. The method of claim 2, wherein the step of performing of the measurement without applying the cell identity split information comprises:

measuring at least one cell having a cell identity not included in the cell identity set among the at least one cell; and measuring at least one cell having a cell identity included in the cell identity set among the at least one cell.

4. The method of claim 1, further comprising:

performing cell reselection based on the cell identity split information.

5. The method of claim 4, wherein the step of performing of the cell reselection comprises:

excluding the at least one cell having the cell identity included in the cell identity set;

selecting a target cell from among the at least one remaining cell; and performing cell reselection with the target cell.

6. The method of claim 1, further comprising:

reporting a measurement result, wherein when the measurement is performed based on the cell identity split information, the measurement result includes at least one measurement value with respect to the at least one cell having a cell identity not included in the cell identity set.

7. The method of claim 6, wherein when the measurement is performed without applying the cell identity split information, the measurement result includes at least one measurement value with respect to the at least one cell having a cell identity included in the cell identity set and the at least measurement value with respect to the at least one cell having a cell identity not included in the cell identity set.

8. The method of claim 1, wherein the predetermined cell type is a closed subscriber group (CSG) cell.

9. An apparatus operating in a wireless communication system, the apparatus comprising:

a Radio Frequency (RF) unit transmits and receives radio signals; and a processor operably coupled to the RF unit, wherein the processor is configured to:

receive cell identity split information indicating a cell identity set reserved for a predetermined cell type from a network;

determine whether to apply the cell identity split information in performing measurement; and measure at least one cell, wherein if the apparatus receives a logged measurement configuration including information regarding performing of logged minimization driving test (MDT), the measurement is performed without applying the cell identity split information, and when the apparatus does not receive the logged measurement configuration, the measurement is performed by applying the cell identity split information.

10. The apparatus of claim 9, the performing of the measurement based on the cell identity split information comprises:

comparing an identity of the at least one cell with the cell identity set indicated by the cell identity split information; and measuring at least one cell having the cell identity not included in the cell identity set among the at least one cell.

11. The apparatus of claim 10, the performing of the measurement without applying the cell identity split information comprises:

measuring at least one cell having a cell identity not included in the cell identity set among the at least one cell; and measuring at least one cell having a cell identity included in the cell identity set among the at least one cell.

12. The apparatus of claim 9, wherein the processor is configured to:

perform cell reselection based on the cell identity split information.

13. The apparatus of claim 12, wherein the performing of the cell reselection comprises:

excluding the at least one cell having the cell identity included in the cell identity set;

selecting a target cell from among the at least one remaining cell; and performing cell reselection with the target cell.

14. The apparatus of claim 9, wherein the processor is configured to:

report a measurement result, wherein when the measurement is performed based on the cell identity split information, the measurement result includes at least one measurement value with respect to the at least one cell having a cell identity not included in the cell identity set.

15. The apparatus of claim 14, wherein when the measurement is performed without applying the cell identity split information, the measurement result includes at least one measurement value with respect to the at least one cell having a cell identity included in the cell identity set and the at least measurement value with respect to the at least one cell having a cell identity not included in the cell identity set.

16. The apparatus of claim 9, wherein the predetermined cell type is a closed subscriber group (CSG) cell.

* * * * *